United States Patent [19]

Bobear

[11] Patent Number: 4,539,357

[45] Date of Patent: Sep. 3, 1985

[54] PEROXIDE CURING POLYSILOXANE COMPOSITIONS HAVING A HIGH TEAR STRENGTH

[75] Inventor: William J. Bobear, Latham, N.Y.

[73] Assignee: General Electric Company, Waterford, N.Y.

[21] Appl. No.: 645,528

[22] Filed: Aug. 29, 1984

Related U.S. Application Data

[63] Continuation of Ser. No. 524,102, Aug. 16, 1983, abandoned, which is a continuation of Ser. No. 389,034, Jun. 16, 1982, abandoned.

[51] Int. Cl.$^3$ .................................................. C08K 5/54
[52] U.S. Cl. ..................................... 524/267; 524/500; 524/543; 524/862; 528/15; 528/24; 528/31; 528/32
[58] Field of Search ............... 524/862, 500, 543, 267; 528/15, 24, 31, 32

[56] References Cited

U.S. PATENT DOCUMENTS

| | | | |
|---|---|---|---|
| 2,890,188 | 6/1959 | Konkle et al. | 524/492 |
| 2,938,009 | 5/1960 | Lucas | 523/212 |
| 2,954,357 | 9/1960 | Fekete | 524/264 |
| 3,159,601 | 12/1964 | Ashby | 528/15 |
| 3,159,662 | 12/1964 | Ashby | 528/15 |
| 3,220,972 | 11/1965 | Lamoreaux | 528/15 |
| 3,436,366 | 4/1969 | Modic | 524/862 |
| 3,635,743 | 1/1972 | Smith | 106/288 Q |
| 3,652,475 | 3/1972 | Wada et al. | 524/266 |
| 3,660,345 | 5/1972 | Bobear | 524/588 |
| 3,671,480 | 12/1972 | Wada et al. | 523/307 |
| 3,696,068 | 10/1972 | Creamer | 524/264 |
| 3,697,473 | 10/1972 | Polmanteer et al. | 524/862 |
| 3,730,932 | 5/1973 | De Zuba et al. | 524/266 |
| 3,775,452 | 11/1973 | Karstedt | 260/429 R |
| 4,041,010 | 8/1977 | Jeram | 524/16 |
| 4,061,609 | 12/1977 | Bobear | 524/703 |
| 4,288,360 | 12/1979 | Bobear | 524/413 |
| 4,322,320 | 3/1982 | Caprino | 524/862 |

OTHER PUBLICATIONS

Organic Syntheses via Metal Carbonyls, vol. 2, pp. 673–704, 1977, Edited by Irving Wender and Piero Pino.

*Primary Examiner*—Melvyn I. Marquis

[57] ABSTRACT

The present invention relates to a silicon composition that cures to a silicone elastomer having a tear strength of abouve 100 p.i. comprising a blend of vinyl-containing gums, a silica reinforcing filler, a hydride cross-linking agent, and a peroxide curing catalyst.

66 Claims, No Drawings

PEROXIDE CURING POLYSILOXANE COMPOSITIONS HAVING A HIGH TEAR STRENGTH

This application is a continuation, of application Ser. No. 524,102, filed 08/16/83 which is a continuation of application Ser. No. 389,034, filed 6/16/82 both abandoned.

BACKGROUND OF THE INVENTION

The present invention relates to a silicone rubber composition, and more particularly the present invention relates to a silicone elastomeric composition which has a tear strength of over 100 pounds per inch.

There has been much innovative work done on heat curable, silicone rubber compositions. Basically, such compositions comprise a diorganopolysiloxane gum having a viscosity of at least 1,000,000 centipoise at 25° C., silica filler, process aids, and a peroxide free radical initiator. See, for instance, DeZuba et al., U.S. Pat. No. 3,730,932. In such compositions, it became necessary to vary the diorganopolysiloxane polymer. Particularly, it was desirable that the diorganopolysiloxane polymer contain vinyl radicals so that it could polymerize more readily into a elastomeric mass with desirable properties. Accordingly, one of the developments in the area was to vary the vinyl unsaturation in the polymer blend, and particularly have a polymer blend made from various kinds of vinyl-containing polymers; see, for instance, U.S. Pat. No. 3,660,345.

Another development was to make a high viscosity, heat-curable silicone rubber composition comprised of vinyl-containing polysiloxanes, a hydride-containing polysiloxane cross-linking agent, and a platinum catalyst with filler and other ingredients. The novel ingredient in such compositions was the use of a hydroperoxide inhibitor which will allow the composition to have a long work life in one instance. In another instance, it allows the compositions to be packaged in a single unit and upon heating the composition at elevated temperatures, i.e., temperatures above 100° C., the composition cured to a silicone elastomeric mass. Such a development is disclosed in Bobear, U.S. Pat. No. 4,061,609. All the patents set forth in the instant case are incorporated by reference.

One variation on the above compositions is, for instance, to be found in Wada et al., U.S. Pat. No. 3,671,480, which discloses a vinyl blend as the base polymers with a silicone hydride and a platinum catalyst. In this patent, the vinyl blend comprises one polymer containing from 0.02 to 0.2 mole percent of vinyl-containing siloxy units which appears to have a high molecular weight, and another vinyl-containing polymer containing at least about 2 mole percent of vinyl-containing siloxy units of somewhat lower molecular weight. From the recitation in the patent, it appears the molecular weight of the second polymer, at the minimum, could be below 100,000 centipoise at 25° C. The purpose of this patent was to produce a high-tear composition. It should be noted that the tear obtained by the samples set forth in the examples varied around 50 pi.

Another patent of interest is Polmanteer et al., U.S. Pat. No. 3,697,473, which describes a heat-curable composition comprising a vinyl siloxane, a hydride polysiloxane composed of various polymeric hydrides, and a platinum catalyst. The invention in this case was in the hydride blend. In this case the tear of the sample was as high in some cases as 200 p.i. However, the method of obtaining such high tear strength appears to have been the use of the novel hydride mixture of Polmanteer et al.

Further developments are disclosed in Wada et al., U.S. Pat. No. 3,652,475, which discloses a heat-curable silicone composition comprising a vinyl-containing polysiloxane of high viscosity, and containing at most 0.3 mole percent of vinyl-containing siloxy units, which was blended with a high viscosity vinyl-containing siloxane of at least the same viscosity as the other polymer, and containing from 5 to 20 mole percent of vinyl-containing siloxy units. Thirdly, there was present another polydiorganosiloxane of a smaller degree of polymerization containing from 5 to 90 mole percent of vinyl-containing siloxy units. Specifically, the vinyl-containing polysiloxane could be of very low molecular weight such that it could easily have a viscosity in the range of 1000 to 100,000 centipoise at 25° C. within most of the degree of polymerization specified in the patent. This composition included silica filler and was cured by an organic peroxide. The tear strength of such compositions as set forth in the Examples was less than 50 p.i., especially after the post cure.

Another pertinent patent in this area is U.S. Pat. No. 3,696,068. This patent discloses a heat-curable silicone stock comprising a vinyl-containing diorganopolysiloxane gum, a linear vinyl-containing fluid having a viscosity from 10 to 150,000 centipoise at 25° C., and further including a vinyl-containing resin. This composition as disclosed was cured with peroxides. The tear strength shown in the examples, and particularly, Table 1, Table 2, and Table 3, exceeded 100 p.i. in some cases, but in most cases, did not exceed 100 p.i. Tables 2 and 3 disclose samples which had tears in excess of 150 p.i. Again, this composition contained a low viscosity vinyl-containing fluid. However, it does not appear that the inventor in U.S. Pat. No. 3,669,068 carried out any measure of the tear of the samples after post-cure. The reason this is mentioned is that with a low vinyl-containing fluid in the composition, it has been found that after post-cure, the tear strength dramatically drops.

A patent application which is of interest is that of Bobear, Ser. No. 203,849, filed on Nov. 4, 1980, now abandoned, which discloses as the basic composition a vinyl-containing polysiloxane which can be a blend of polysiloxanes, a hydride polysiloxane, a platinum catalyst, and an inhibitor compound having at least one hydroperoxide radical. It is also disclosed that there can be an organic peroxide accelerator compound in the composition so as to accelerate the cure of the composition at elevated temperatures. It should be noted that the vinyl-containing polysiloxane disclosed in the specification can be as disclosed a blend of different vinyl-containing polysiloxanes. There is not disclosed what those types of vinyl-containing polysiloxanes can be or what the advantages of different types of vinyl-containing polysiloxanes can be in the composition.

Another patent of interest is that of Bobear, Ser. No. 106,795, filed on Dec. 26, 1979, now U.S. Pat. No. 4,288,360, which disclosed a flame retardant, heat-curable composition comprising an organopolysiloxane gum, a filler, a platinum compound and various amounts of a hydrated aluminum, titanium dioxide and magnesium oxide.

A more pertinent patent is that of Bobear et al., Ser. No. 156,137, filed on June 3, 1980, now abandoned, which discloses an SiH-olefin platinum catalyzed, high viscosity composition containing therein a silanol material which helps regulate the cure of the composition. The composition of the foregoing application Ser. No. 156,137 and Bobear U.S. Pat. No. 4,061,609, were effective in producing compositions whose cure could be regulated or inhibited and were desirable in that they had sufficient work life and could be inhibited so as to be stored in a one-component package. In addition, by varying the vinyl blend in accordance with U.S. Pat. No. 3,660,345, desirable tear strength properties would be obtained.

These compositions were very desirable, in that they could be hot air vulcanized, that is, they could be cured by hot air making them very desirable for medicinal tubing and other uses. However, the tear-strength properties of such compositions were limited, especially when the composition was post-cured as was desirable in most cases.

There was some experimentation with the variation of the vinyl blend to increase the tear-strength properties of the composition in accordance with Bobear, U.S. Pat. No. 3,660,345 with some success. However, it has now been unexpectedly found that by having a particular type of vinyl blend of two high viscosity polymers, a filler, a peroxide curing agent, and a hydride polysiloxane present, that the composition can cure to a silicone elastomer with exceedingly high tear strengths (in most all cases above 100 p.i. and in some cases exceeding 200 p.i.). This was achieved without having a complicated hydride blend which is difficult to make due to the natural instability of the hydride polysiloxanes or by utilizing a low viscosity vinyl fluid which it was later found would result in a composition whose post-cure tear strength would degrade dramatically.

Accordingly, it is one object of the present invention to provide for a high-tear-strength silicone rubber composition comprising a vinyl-containing polysiloxane gum blend.

It is another object of the present invention to provide for a polysiloxane composition that cures to a silicone elastomer having a tear strength after post-cure of above 100 p.i. which is formed from a high viscosity vinyl-containing polysiloxane blend, a hydride polysiloxane, and a peroxide curing agent.

It is an additional object of the present invention to provide a process for forming a heat curing silicone elastomeric composition having a tear strength of above 100 p.i. which is formed from a vinyl-containing polysiloxane blend, a hydride polysiloxane, and a peroxide curing agent.

It is yet still a further object of the present invention to provide medical tubing and spark plug boots which have a tear strength of above 100 p.i. which are formed from a high viscosity polysiloxane blend, a hydride polysiloxane cross-linking agent, and a peroxide curing agent.

These and other objects of the present invention are accomplished by means of the disclosures set forth herein below.

SUMMARY OF THE INVENTION

In accordance with the above objects, there is provided by the present invention, a polysiloxane composition that cures to a silicone elastomer having a tear strength of above 100 p.i. comprising:

(A) 60-95 parts of a first vinyl-terminated linear diorganopolysiloxane gum having a viscosity in the range of $1 \times 10^6$ to $20 \times 10^7$ centipoise at 25° C. and having a vinyl concentration that can vary from 0.005 to 0.1 mole percent of siloxy units with at least one vinyl radical attached to silicon, and where the organo group is a monovalent hydrocarbon radical.

(B) from 5.0 to 40.0 parts by weight of a second vinyl-containing diorganopolysiloxane gum having a viscosity varying from $1 \times 10^6$ to $20 \times 10^7$ centipoise at 25° C. wherein the vinyl concentration varies from 0.5 to 15.0 mole percent, wherein the mole percent vinyl concentration (of siloxy units with at least one vinyl radical attached to silicon) increases from 0.5 to 15.0 mole percent, as the second vinyl-containing gum concentration in the composition decreases from 40.0 to 5.0 parts by weight wherein the organo group is a monovalent hydrocarbon group;

(C) from 10 to 300 parts by weight of a filler, at least part of which is a reinforcing silica filler;

(D) from 0.1 to 25 parts by weight of hydride-containing polysiloxane having a hydride content varying from 0.05 to 5.0 percent by weight and a viscosity varying from 10 to 1000 centipoise at 25° C.; and (E) a curing agent being present at a concentration of at least an effective amount of free radical initiator selected from the class consisting of organic peroxides and organic hydroperoxides.

Basically, the process for forming this composition comprises mixing the ingredients and heating the composition at elevated temperatures; i.e., temperatures above 100° C. for a period of time varying anywhere from 60 seconds to 30 minutes. Preferably, the method of vulcanization comprises hot air vulcanization, and just such a method is particularly suited to producing medical tubing and spark plug boots of high tear strength. It is, of course, obvious that to produce the high-tear-strength-composition, there must be present some silica filler in the composition, and particularly a reinforcing silica filler in the composition such as fumed silica and precipitated silica. A platinum catalyst may be incorporated in the composition to speed up the cure, but it is not necessary; it may or may not be used.

DESCRIPTION OF THE PREFERRED EMBODIMENT

Before going into the description of the invention, it is necessary also to discuss the fact that the curing of vinyl-containing compounds with hydrides in the presence of peroxide is known as exemplified by the disclosure in the publication *Organic Synthesis Via Metal Carbonyls*, Vol. 2, p 673 (1977) edited by Irving Wender and Piero Pino. What was not known, however, was to produce a high-tear compound utilizing a particular type of vinyl blend of diorganopolysiloxane gums which were reacted with a hydride polysiloxane and a peroxide curing agent.

Now, proceeding to the invention, the invention in the first aspect comprises 60-95 parts by weight of a first vinyl-terminated linear diorganopolysiloxane gum having a viscosity in the range of $1 \times 10^6$ to $20 \times 10^7$ centipoise at 25° C., and having a vinyl concentration that can vary anywhere from 0.005 to 0.1 mole percent vinyl, and where the organo group is a monovalent hydrocarbon radical.

In the first aspect of the invention, preferably the polymer is just vinyl-terminated. However, the polymer can also have vinyl on-chain groups in accordance with the vinyl content of the gum. It should be noted that this is a gum that has a viscosity of anywhere from 1,000,000 to 200,000,000 centipoise at 25° C., and more preferably has a viscosity in the range of 10,000,000 to 100,000,000 centipoise at 25° C. Also, preferably, the mole percent vinyl can be anywhere from 0.01 to 0.08 mole percent vinyl. Preferably, such a first vinyl-containing gum has the formula

(1)

wherein in the above formula, Vi is vinyl, R is selected from $C_{1-8}$ monovalent hydrocarbon radicals free of aliphatic unsaturation, and $R^1$ is a $C_{1-8}$ monovalent hydrocarbon radical, and x and t vary such that the viscosity of the gum varies from $1 \times 10^6$ to $20 \times 10^7$. More preferably, it varies from $1 \times 10^7$ to $15 \times 10^7$ centipoise at 25° C. The radical R can be selected from any monovalent hydrocarbon radical such as alkyl radicals from 1 to 8 carbon atoms such as methyl, ethyl, propyl, phenyl radicals; mononuclear aryl radicals such as phenyl, methylphenyl, etc.; cycloalkyl radicals such as cyclohexyl, cycloheptyl, etc.; fluoroalkyl radicals such as 3,3,3-trifluoropropyl, etc. Accordingly, R can be any substituted or unsubstituted monovalent hydrocarbon radical which is substantially inert to the addition reactions. The radical $R^1$ can be any of the same foregoing radicals given for R and in addition an alkenyl radical such as vinyl, allyl, etc. Most preferably, $R^1$ is not an alkenyl radical.

A second component of the diorganopolysiloxane gum is another gum which comprises from 5.0 to 40.0 parts by weight of a second vinyl-containing diorganopolysiloxane gum having a viscosity varying from $1 \times 10^6$ to $20 \times 10^7$ centipoise at 25° C., wherein the vinyl concentration varies from 0.5 to 15.0 mole percent and wherein as the mole percent vinyl concentration increases from 0.5 to 15 mole percent, the second vinyl-containing gum concentration in the composition decreases from 40.0 to 5.0 parts by weight where the organo group is a monovalent hydrocarbon radical. It is important in the invention that as the second vinyl-containing diorganopolysiloxane gum decreases in concentration in the vinyl blend, then its mole percent vinyl preferably increases. By preferred, it is meant that it can either increase or stay the same. However, it is important that if the second vinyl-containing gum contain from 10 to 15 mole percent of vinyl siloxy units, it should not be present in the composition at a concentration of, say, 20 to 40 parts by weight per 80 to 60 parts by weight of the first vinyl-containing gum. If there is a high concentration of a high vinyl-containing gum in the composition close to the high viscosity limits given above in the composition, then the composition will not have as high tear strength as is desirable. It is preferred that as the viscosity of the gum increases within the above prescribed units that its vinyl concentration decrease.

Accordingly, as the concentration of the second vinyl-containing gum increases in the blend mixture, then it is necessary that its mole percent vinyl concentration in the gum decrease within the range indicated above. Preferably, the vinyl concentration of the second vinyl-containing gum varies from 0.5 to 10 mole percent. In addition, it is preferred that the viscosity of the second vinyl-containing gum vary anywhere from 1 to $200 \times 10^6$ centipoise at 25° C. It is desirable that the viscosity of the two gums be as high as possible within the foregoing viscosity limits given above, and experiments seem to indicate that the higher viscosity blends result in the elastomers with a higher tear strength. Further, in the concentration of the two gums, the more preferred range of utilization of the two gums is from 70 to 95 parts of the first vinyl-terminated linear diorganopolysiloxane gum with from 5 to 30 parts by weight of the second vinyl-containing diorganopolysiloxane gum. This second vinyl-containing gum preferably has vinyl on-chain units only. However, in a broader embodiment of the present invention, the second vinyl-containing gum can be vinyl-terminated as well as containing vinyl on-chain within the prescribed limits of vinyl concentration indicated above. It is important that both the vinyl-containing gums do not contain any more vinyl than indicated in the above language since if too much vinyl is present in the polymer blend, then the cured elastomer will not have optimum tear-strength properties. Further, it should be noted that either gum can be either a singular polymer species or polymer blend with the foregoing viscosities and vinyl concentrations. It is also important to note that there should be no vinyl-containing fluid in the composition. It has been found that the compositions with vinyl-containing fluids of a viscosity, say in the 500,000 centipoise range or less, result in elastomers with good tear strength initially; but, after the composition has been subjected to post-cure, its tear-strength properties degrade dramatically.

Preferably, the second vinyl-containing gum has the formula

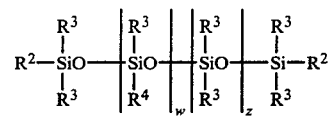
(2)

where $R^2$, $R^4$ are selected from $C_{1-8}$ monovalent hydrocarbon radicals, $R^3$ is a $C_{1-8}$ monovalent hydrocarbon radical free of aliphatic unsaturation, and w and z vary such that the viscosity of the gum varies from $1 \times 10^6$ to $20 \times 10^7$ centipoise at 25° C. and, more preferably, varies from $20 \times 10^6$ to $100 \times 10^6$ centipoise at 25° C. and wherein as the vinyl concentration of the gum varies from 0.5 to 15.0 mole percent provided the viscosity of the gum increases as the vinyl concentration approaches 0.5 mole percent. This is another aspect of the present invention; i.e., it is not desirable to have a high vinyl-containing, high-viscosity gum within the range indicated above since this would result in a composition with poor tear-strength properties when it was cured.

The radical $R^3$ can be any of the radicals given for the radical for the Formula (1) above. Further, the $R^2$ and $R^4$ radicals can be any of the $C_{1-8}$ monovalent hydrocarbon radicals previously given for the radical R in Formula (1) and in addition can be alkenyl radicals such as vinyl, allyl, etc.

The vinyl-containing gums can be made by a process well known in the art such as, for instance, reacting vinyl-containing cyclotetrasiloxanes in the presence of low molecular weight linear vinyl chain stoppers at high temperatures in the presence of basic catalysts so as to yield the polymer of the desired molecular weight. When the reaction is over, then the catalyst is neutralized, the excess cyclics vented off to result in the desired polymer. By controlling the amount of chain stopper and the temperature of reaction, there can be controlled the molecular weight of the desired vinyl-containing polymer end product. For more information as to the process with which such vinyl-containing polymers are produced, one is referred to the disclosure of Bobear, U.S. Pat. No. 3,660,345, disclosed previously.

To the 100 parts of the vinyl blend of gums, there is added in the composition from 10 to 300 parts by weight of a filler, at least part of which is a reinforcing silica filler. A reinforcing silica filler is needed in the composition if the composition is to have high-tear-strength-properties, and particularly tear-strength-properties which are above 100 p.i. after post-cure aging. Examples of reinforcing silica fillers that can be utilized are, for instance, fumed silica and precipitated silica, and especially fumed silica. The fumed silica or precipitated silica can be treated with various agents so as to prevent the uncured composition from structuring, for example, cyclopolysiloxanes as disclosed in Lucas, U.S. Pat. No. 2,938,009, and silazanes as disclosed in Smith, U.S. Pat. No. 3,635,743. The reinforcing fillers are generally used at a concentration of 10 to 200 parts by weight, preferably 10 to 100 parts by weight, and there can be utilized in addition other extending fillers in the composition.

Extending fillers that may be utilized are, for instance, selected from the class consisting of titanium dioxide, lithopone, zinc oxide, zirconium silicate, silica aerogel, iron oxide, diatomaceous earth, calcium carbonate, glass fibers, magnesium oxide, chromic oxide, zirconium oxide, aluminum oxide, alpha quartz, calcined clay, carbon, graphite, cotton, and synthetic fibers. These are some of the extending fillers that can be utilized to give the composition additional desired properties for one reason or another. It should be noted that to produce the silicone elastomer, it is not necessary to have a filler, particularly a fumed silica, but if it is desired to have a high-tear-strength-composition, it is necessary to have substantial amounts of fumed silica or other reinforcing filler in the composition.

Per 100 parts of vinyl diorganopolysiloxane blend, there must be from 0.1 to 25 parts by weight of a hydride-containing polysiloxane having a hydride content varying from 0.05 to 5 percent by weight and preferably having a hydride content varying from 0.05 to 2 percent by weight and a viscosity varying from 10 to 1000 centipoise at 25° C. and, more preferably, having a viscosity varying from 10 to 100 centipoise at 25° C. The hydride cross-linking agent may be either a linear hydride or a hydride-containing resin. Preferably, the hydride polysiloxane is a linear diorganopolysiloxane polymer having the formula

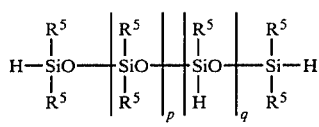

(3)

where $R^5$ is selected from $C_{1-8}$ monovalent hydrocarbon radicals free of aliphatic unsaturation, and p and q vary such that the viscosity of the hydride polysiloxane varies from 10 to 100 centipoise at 25° C. and, more preferably, the viscosity of the polymer varies from 10 to 100 centipoise at 25° C. and the hydride content varies from 0.05 to 2.0 percent by weight. It is desirable that the hydride polysiloxane not contain too little hydride, otherwise the compositions will not cure completely. On the other hand, if it has too much hydride, there will be excess hydride polysiloxane in the composition, possibly acting as a plasticizer, and the composition will not have as high tear-strength as possible. Such hydride polysiloxanes in Formula (3) can be made by many procedures which are known in the art, and particularly by the hydrolysis of the appropriate chlorosilanes. For more information as to the production of such hydrides, one is referred to the disclosure of U.S. Pat. No. 4,041,010, which is incorporated by reference.

Another type of hydride cross-linking agent that may be utilized is a hydride resin having

(4)

and $SiO_2$ units where $R^6$ is a $C_{1-8}$ monovalent hydrocarbon radical free of aliphatic unsaturation and the $R^6+H$ to SiO ratio varies from 1.0 to 2.7 wherein the hydride content varies from 0.05 to 2 percent by weight. It should be noted that both in Formula (3) as well as in the hydride resin above, that the $R^5$ and $R^6$ radicals can be any of the radicals previously given for the R radical of Formula (1). These radicals can be any hydrocarbon radical whether substituted or unsubstituted which do not enter into the hydrosilation reaction. Again such a resin is made by hydrolysis of the appropriate chlorosilanes and purification thereof.

Another type of hydride resin is one having difunctional units. Accordingly, there can be utilized in the instant invention, the hydride-containing polysiloxane which is a hydride resin having

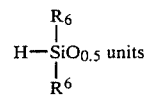

monofunctional units and $SiO_2$ tetrafunctional units, and $R_2^6SiO$ difunctional units, where the $R^6+H$ to Si ratio varies from 1.2 to 2.7 and $R^6$ is selected from $C_{1-8}$ monovalent hydrocarbon radicals free of aliphatic unsaturation which are selected from the same monovalent hydrocarbon radicals given for the R radical of Formula (1). It should be noted that basically most of the radicals in these polymers are selected from methyl, phenyl and vinyl, in accordance with the disclosure since these are the simplest polysiloxanes to be produced. The phenyl polysiloxanes or some phenyl substitution in the polysiloxane may be desirable so as to give the composition certain properties. Other than that, it is preferable the polysiloxane contain only methyl for the hydrides and methyl, vinyl substitution for vinyl-containing polysiloxanes. These are the simplest and cheapest polysiloxanes to produce. Further, the hydride-containing difunctional siloxy units preferably have a vinyl concentration that varies anywhere from 0.05 to 2.0 percent by weight. Again, such a hydride resin containing difunctional siloxy units is well known in the art as shown in U.S. Pat. No. 4,041,010 whether containing fluoro substituent units or not, and can be utilized as a cross-linking agent in the present composition. Further, such hydride cross-linking agent can be produced by methods well known in the art as noted in the foregoing U.S. Pat. No. 4,041,010.

Finally, in the composition there must be a curing agent which is free radical initiator and which is desirably present at a minimum, as an effective amount and is generally selected from organic peroxides and organic hydroperoxides.

Examples of suitable hydroperoxides are, for instance, disclosed in U.S. Pat. No. 4,061,609, such as, for instance, tertiary butylhydroperoxide, methylethylketone hydroperoxide, cumene hydroperoxide, 1,1,3,3-tetramethylbutylhydroperoxide and dimethyl 2,5-dihydroperoxy hexane. The more preferable peroxides are the organic peroxides, and particularly the vinyl specific peroxides. The preferred curing agents are organic peroxides conventionally used to cure silicone elastomers. Some peroxides that may be used are the dialkyl peroxides which may have the structural formulas,

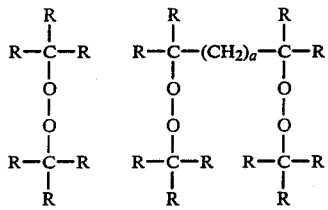

wherein R represents the same alkyl group throughout or alkyl groups of two or more different types and a is zero or a larger integer.

Among the dialkyl peroxide curing catalysts that can be used are di-tertiary-butyl peroxide, tertiary-butyl-triethylmethyl peroxide, tertiary-butyl-tertiary-butyl-tertiary-triphenyl peroxide, t-butyl perbenzoate and a di-tertiary alkyl peroxide such as dicumyl peroxide. Other peroxide catalysts which effect curing through saturated as well as unsaturated hydrocarbon groups on the silicon chain are aryl peroxides which include chloroalkyl peroxides such as 2,4-dichlorobenzoyl peroxide, parachlorobenzoyl peroxide; orthochlorobenzoyl peroxide, benzoyl peroxide, etc. The best dialkyl peroxide that has been found is 2,5-dimethyl-2,5-bis(t-butylperoxy)hexane.

Accordingly, the most preferred peroxides are the vinyl specific peroxides and the ones that have been found to give the best curing tear strength composition are for instance:

2,5 dimethyl-2,5-di(t-butylperoxy)hexane
2,5 dimethyl-2,5-di(t-butylperoxy)hexyne-3
di-t-butylperoxide
5-butylcumylperoxide
α,α'bis(t-butylperoxy)di-isopropylbenzene Preferably, there is present at least 0.1 parts by weight of the curing agent per 100 parts of the rest of the composition. More preferably, there is utilized from 0.1 to 2 parts by weight of the curing agent—specifically the peroxide—per 100 parts of the rest of the composition. It should be noted that there is nothing critical about the concentrations of the peroxide, that being used in the specific composition that results in the best tear-strength properities.

Finally, there may be utilized as a cure accelerator from 1 to 500 ppm of platinum in the composition as a platinum compound and particularly one of the platinum catalyst compounds well known in the art. The platinum catalyst which may be utilized in the present composition may be a platinum deposited on a solid carrier such as platinum on charcoal or platinum on gamma alumina or may be a solubilized platinum complex. The solubilized platinum complex are preferred in the present composition since they are more reactive.

Preferred platinum catalysts are those platinum compound catalysts which are soluble in the present reaction mixture. The platinum compound can be selected from those having the formula (PtCl$_2$ Olefin)$_2$ and H(PtCl$_3$ Olefin) as described in U.S. Pat. No. 3,159,601, Ashby. The olefin shown in the previous two formulas can be almost any type of olefin but is preferably an alkenylene having from 2 to 8 carbon atoms, a cycloalkenylene having from 5 to 7 carbon atoms or styrene. Specific olefins utilizable in the above formulas are ethylene, propylene, the various isomers of butylene, octylene, cyclopentene, cyclohexane, cycloheptane, etc.

A further platinum containing material usable in the composition of the present invention is the platinum chloride cyclopropane complex (PtCl$_2$C$_3$H$_6$)$_2$ described in U.S. Pat. No. 3,159,662, Ashby.

Still, further, the platinum containing material can be a complex formed from chloroplatinic acid with up to 2 moles per gram of platinum of a member selected from the class consisting of alcohols, ethers, aldehydes and mixtures of the above as described in U.S. Pat. No. 3,220,972, Lamoreaux.

The preferred platinum compound to be used not only as a platinum catalyst but also as a flame retardant additive is that disclosed in U.S. Pat. No. 3,775,452, Karstedt. Generally speaking, this type of platinum complex is formed by reacting chloroplatinic acid containing 4 moles of water of hydration with tetravinylcyclotetrasiloxane in the presence of sodium bicarbonate in an ethanol solution.

The Karstedt or Lamoreaux catalysts are preferred in the present composition since they are the most reactive and result in the cure rate of the composition being most easily controlled. The Karstedt catalyst which is the most preferred is generally an alkenyl polysiloxane complexed with platinum and which is substantially free of chlorine radicals. The platinum catalyst can or cannot be utilized. It is not necessary for the higher tear-strength properties or the cure of the composition to have the platinum. However, the platinum, if utilized, does act as a cure accelerator.

Other ingredients which are desirable, but not necessary, in the instant composition are, for instance, process aids. Thus, generally, it is desirable to have per 100 parts of the base vinyl diorganopolysiloxane gum, from 1 to 25 parts by weight of a process aid. Process aids are necessary in high viscosity compositions so as to process them on mills and fabrication equipment.

The process aid may be a dihydrocarbon-substitued polysiloxane oil having hydrocarbon substituent to silicon atom ratio of from 1.6 to 2.0 and whose hydrocarbon substituents comprise at least one member selected from the class consisting of methyl, ethyl, vinyl, allyl, cyclohexenyl and phenyl groups, said polysiloxane oil comprising polysiloxane molecules containing an average of from one to two lower alkoxy groups bonded to each of the terminal silicon atoms where the alkoxy groups are selected from the class consisting of methoxy, ethoxy, propoxy and butoxy.

Preparation of the alkoxy-containing hydrocarbon-substituted polysiloxane oils employed as a process aid in the present invention can be carried out by producing one or more types of cyclic dihydrocarbon-substituted polysiloxanes from one or more types of dihydrocarbon-substituted dichlorosilanes and disalkoxysilanes in accordance with the hydrolysis, depolymerization and fractional distillation procedures described in detail above with reference to the preparation of the gum of Formula (1). Then one or more types of cyclic siloxanes so produced are mixed with predetermined amounts of a dihydrocarbon-substituted dialkoxysilane and the mixture is subjected to an equilibrium treatment under controlled conditions to produce the desired alkoxy endblocked hydrocarbon-substituted linear polysiloxane oil.

The alkoxy-containing hydrocarbon-substituted polysiloxane oils suitable for use in the present invention are relatively low molecular weight polysiloxane oils whose polymer chains have at least four and as much as thirty-five and more dihydrocarbon siloxy units per molecule. The polysiloxane oils preferably have an average of at least one and not more than two alkoxy groups bonded to each of the terminal silicon atoms of the molecule. A more detailed disclosure of the alkoxy end-blocked polysiloxane process aids, as well as their method of preparation, is to be found in the disclosure of Fekete, U.S. Pat. No. 2,954,357 which is hereby incorporated into this specification by reference.

There may also be used as a process aid hydroxylated organosilanes which contain from one silicon-bonded hydroxyl per 70 silicon atoms to two silicon-bonded hydroxyls per silicon atom and contains from 1.9 to 2.1 hydrocarbon radicals per silicon atom. The remaining valences of the silicon atom are satisfied by oxygen atoms. The hydroxylated materials include both monomers such as diphenylsilanediol and polymeric materials which contain two silicon-bonded OH groups in the molecule. In addition, the hydroxylated organosilane may be a mixture of hydroxyl-containing siloxanes and completely condensed siloxanes. Irrespective of the particular composition of the hydroxylated organosiloxane, it is necessary that there be present in said organosilane from one OH per 70 silicon atoms to two OH per silicon atom.

The hydroxylated siloxanes may be prepared by any suitable method, such as heating said siloxanes with steam under pressure at temperatures of about 120° C. or hydrolyzing silanes of the formula $R_nSiX_{4-n}$ where X is any hydrolyzable group such as Cl, OR, H, —OOR and R is a monovalent hydrocarbon radical. The former method is preferred for the preparation of those hydroxylated materials in which the hydrocarbon radicals are alkyl, while the latter method is best for the siloxanes in which hydrocarbon radicals are monocyclic aryl hydrocarbon radicals. Further, detailed information as to the hydroxylated organosiloxanes which may be used as process aids to be found in Konkle et al. U.S. Pat. No. 2,890,188, the disclosure of which is incorporated into this application by reference.

Any of the above process aids may be used alone or mixtures thereof may be used in the above-defined concentrations. Further, other suitable process aids may also be used in the silicone rubber composition of the present invention. As stated, the process aids are desirable in the composition so as to facilitate its processing on milling equipment and other fabrication equipment because of the high viscosity of the gum.

There may also be incorporated in the final composition, a third vinyl-containing siloxane, and specifically a vinyl-containing resin. The use of such vinyl-containing resins has been found to give the composition good reinforcing tear-strength properties.

Accordingly, there may be present in the composition per 100 parts of the base vinyl-containing diorganopolysiloxane gum blend from 1 to 50 parts by weight of an organopolysiloxane resinous co-polymer having therein $R_3^8SiO_{0.5}$ monofunctional units and $SiO_2$ tetrafunctional units, where $R^8$ is a member selected from a class of vinyl radicals and monovalent hydrocarbon radicals free of aliphatic unsaturation where the ratio of monofunctional units to tetrafunctional units being from 0.5 to 1 to 1 to 1, and from where about 2.5 to 10 mole percent of the silicon atoms contain silicon bonded vinyl groups. The radical $R_8$ can be any of the radicals given for the radical of $R^1$ in Formula (1). It should be noted further that this resin should not contain any hydride groups in it.

There can also be utilized a similar resin having difunctional siloxy units. Accordingly, per 100 parts of the base vinyl-containing diorganopolysiloxane gums, there may be incorporated into the composition from 20 to 50 parts by weight of an organopolysiloxane resinous co-polymer comprising $R_3^8SiO_{0.5}$ monofunctional units and $SiO_2$ tetrafunctional units and $R_2^8SiO$ difunctional units, where $R^8$ is a member selected from a class consisting of vinyl radicals and monovalent hydrocarbon radicals free of aliphatic unsaturation where the ratio of monofunctional units to the tetrafunctional units is 0.5 to 1 to 1 to 1 and the difunctional units that are preferably present in amount equal to about 1 to 10 mole percent based on the total number of moles of siloxy units in the co-polymer and wherein the resinous co-polymer contains from about 2.5 to 10 mole percent of vinyl groups.

Such a resinous co-polymer can be present in the composition in the foregoing quantities indicated above, and more preferably, at the concentration of 5 to 25 parts by weight per 100 parts of the base vinyl-containing diorganopolysiloxane gum blend. It has been found such vinyl-containing resins produce good cured elastomeric compositions with good tear strength even after post-cure aging. Unlike the low viscosity vinyl-containing fluids, the compositions with the vinyl-containing resins have good tear-strength-properties even after post-cure aging, i.e., above 100 p.i. Such resins are known and are produced by methods well known in the art and can be utilized within the prescribed above quantities with good results. Further, such resins are usually produced by hydrolysis of the appropriate chlorosilanes which method is well known in the art. For further information as to such resins, one is referred to the disclosure of Modic, U.S. Pat. No. 3,436,366, There may be incorporated other ingredients in the composition such as compression set additives such as rare earths octoate, and various other ingredients. Also, there may be incorporated other process aids and various types of other ingredients, such as self-bonding additives as disclosed in DeZuba et al., U.S. Pat. No. 3,730,932. However, the above are the basic ingredients that are necessary in the composition with the additional optional desirable additives as disclosed above; i.e., the specific process aids disclosed above or the platinum catalyst, or the vinyl-containing resins. These ingredients may be added with desirable effects and, as stated, other ingredients may be added as desired to produce specific results such as self-bonding, etc. If platinum is in the composition, there may be present an inhibitor. Specifically, the hydroperoxide compound may also be present as inhibitor in the composition especially if platinum is present.

Further, the composition may be prepared in many ways. First of all, the composition ingredients may be mixed with or without platinum, and if platinum is present with an inhibitor, without the peroxide, and stored as such. When it is desired to fabricate the composition, the composition can be milled, the peroxide added, and then the composition heated at a temperature above 100° C. for periods of time varying from 60 seconds to 60 minutes to result in a cured elastomer. Then, subsequently, it may be post-cure aged for a period of time varying anywhere from 1 to 4 hours at temperatures above 100° C. The means of vulcanization may be hot air vulcanized or other means.

In another method with respect to the present composition, the composition—especially if platinum is present—may be packaged in separate packages without the hydride, the vinyl-containing siloxane and platinum being in the same package. Then, when it is desired to cure the composition, the two compositions are mixed, there is added a peroxide or hydroperoxide curing agent to the composition, and then the composition is heated at temperatures above 100° C. for the foregoing time period. Irrespective of which method of packaging and preparing the composition is undertaken, desirably the peroxide catalyst is not added to the composition until just before it is molded and fabricated to the desired part just before it is subjected to vulcanization. In some cases the peroxide catalyst may be added beforehand, but the problem with this is that the peroxide tends to degrade upon storage. It is not usually the practice to incorporate such peroxides in the composition prior to the time they are milled and fabricated and vulcanized into the desired part. By this method, there can be produced various parts such as tubing, and specifically medical tubing, spark plug boots and other parts which have high-tear-strength; i.e., tear strengths of above 100 p.i., and in some cases above 200 p.i., and which even after post-cure aging, may have tear strengths of above 100 p.i.

The examples given below are given for the purpose of illustrating the present invention. They are not given for any purpose of setting limits and boundaries to the instant invention. All parts are by weight.

EXAMPLE 1

There was prepared a composition comprising 80 parts by weight of a vinyl-terminated dimethylpolysiloxane gum of $5.33 \times 10^7$ centipoise at 25° C. and 20 parts of a 0.6 mole percent vinyl on-chain trimethylsiloxy end-stopped dimethylpolysiloxane gum having a viscosity of $4.54 \times 10^7$ centipoise at 25° C. where the viscosity of the blend was approximately $5 \times 10^7$ centipoise at 25° C. To this mixture there was added 1.5 parts of a hydroxy-stop dimethylpolysiloxane oil, process aid. In addition, there was added to this mixture 42 parts by weight of an octamethylcyclotetrasiloxane treated fumed silica. Then there was added 2 parts by weight of a hydride linear polysiloxane which had hydride terminal groups and hydride on-chain groups and a viscosity in the range of 35 to 75 centipoise at 25° C. and a hydride content of 0.72 to 1.0 percent by weight. This mixture was cured with 0.5 parts by weight of 2,5-dimethyl 2,5-ditertiarybutylperoxyhexane per 100 parts of the rest of the mixture. This mixture was press-cured for 10 minutes at 350° F. and a sample was taken to evaluate the properties. In addition the mixture was further post-cured by oven baking it for 2 hours at 350° F. and the physical properties were evaluated. The results are as follows:

| PHYSICALS | PRESS-CURE 10 min./350° F. | OVEN BAKING 2 hrs./350° F. |
|---|---|---|
| Hardness Durometer | 45 | 49 |
| Tensile Strength, psi | 1169 | 1222 |
| % Elongation | 720 | 650 |
| Die B, Tear Strength, pi | 202 | 215 |

EXAMPLE 2

There was prepared a second composition comprising 80 parts by weight of a vinyl-terminated dimethylpolysiloxane gum having a viscosity of $2.6 \times 10^7$ centipoise at 25° C. and 20 parts by weight of a 0.6 mole percent vinyl on-chain gum having a viscosity of $4.65 \times 10^7$ centipoise at 25° C. To this blend there was added 17 parts by weight of a 60 percent solids in xylene solution of a vinyl-containing resin containing monofunctional vinylmethylsiloxy units and tetrafunctional $SiO_2$ units wherein the vinyl content of the resin was in the range of 1.8 to 2.4 weight percent and wherein the monofunctional to tetrafunctional ratio was equal to 0.6. To this composition there was added 3 parts of the same process aid as in Example 1, and 60 parts by weight of the octamethylcyclotetrasiloxane treated fumed silica of Example 1. This mixture was cooked at 150° C. for 1-1½ hours and cooled. To 172 parts by weight of the cooled mixture, there was added 6 parts by weight of the hydride of Example 1 and 3 parts by weight of a curing catalyst composition which was 33 percent by weight of a dimethylpolysiloxane oil, trimethylsiloxy end-stopped, having a viscosity less than 100,000 centipoise at 25° C. and 67 percent by weight of Varox powder (Varox is the trade name of R. T. Vanderbilt Co.), Varox being a mixture of 50 percent by weight of 2,5-dimethyl-2,5-bis(t-butylperoxy)hexane and 50 percent by weight of inert diluent.

The physical properties of the composition were evaluated by first press-curing the composition at 350° F. for 10 minutes and evaluating the physical properties and then post baking the composition for 4 hours at 400° F. and then evaluating the properties. The properties are as follows:

| PHYSICALS | PRESS-CURE 10 min./350° F. | PRESS-CURE 4 hrs./400° F. |
|---|---|---|
| Hardness, Durometer | 59 | 69 |
| Tensile Strength, psi | 1101 | 1096 |
| % Elongation | 680 | 400 |
| Die B, Tear, pi | 297 | 248 |

EXAMPLE 3

There was prepared a composition comprising the same blend of the same vinyl-terminated gum and vinyl on-chain containing gums of Example 2. To this vinyl gum blend there was added instead of a vinyl-containing resin 12.75 parts of a vinyl-containing oil which had a viscosity of 1410 centipoise at 25° C. This vinyl-containing oil contained 2 mole percent of methylvinylsiloxy units and was trimethylsiloxy end-stopped. To this composition, there was added 3 parts of the same hydride as in Example 1, and 3 parts of the same catalyst system as Example 2. In addition, this composition contained the same type and quantity of process aid and octamethylcyclotetrasiloxane treated silica. The difference in the composition of Example 2 and this Example was the presence of the vinyl oil in place of the vinyl resin and the concentration of the hydride resin. The composition was press-cured at 350° F. for 10 minutes and its properties evaluated. Then the composition was press-cured for 4 hours at 400° F. and the properties were evaluated. The results are set forth below:

| PHYSICALS | PRESS-CURE 10 min./350° F. | PRESS-CURE + 4 hrs./400° F. |
|---|---|---|
| Hardness, Durometer | 68 | 72 |
| Tensile Strength, psi | 1064 | 976 |
| % Elongation | 400 | 170 |
| Die B, Tear, pi | 303 | 80 |

As noted previously, the composition prepared with the vinyl oil had low strength properties after post-cure aging. This is undesirable in the present composition.

EXAMPLE 4

A blend was prepared of 80 parts by weight of a vinyl-terminated dimethylpolysiloxane gum of $6.25 \times 10^7$ centipoise viscosity at 25° F. and 20 parts by weight of 0.6 mole percent vinyl gum, which had a vinyl on-chain and was trimethylsiloxy end-stopped and a viscosity of $4.38 \times 10^7$ centipoise at 25° C. which were blended to a blend viscosity of $5.7 \times 10^7$ centipoise at 25° C. To this composition, there was added 2 parts by weight of the process aid of Example 1 and 40 parts by weight of an octamethylcyclotetrasiloxane treated fumed silica. There was also added one part by weight of the same hydride compound of Example 1. There was present 0.015 parts by weight of a methylethylketone peroxide solution as an inhibitor. The composition was cured with 0.5 parts by weight of 2,5-dimethyl-2,5-bis(t-butylperoxy)hexane per 100 parts by weight of the rest of the composition. The physicals were evaluated by press-curing the composition for 10 minutes at 350° F. The results are as follows:

| PHYSICALS | PRESS-CURE 10 min./350° F. |
|---|---|
| Hardness, Durometer | 50 |
| Tensile Strength, psi | 1297 |
| % Elongation | 660 |
| Die B Tear, pi | 149 |

EXAMPLE 5

There was prepared a composition which was the same as Example 4, but a different batch. The composition was press-cured for 10 minutes at 350° C. and the physicals evaluated. Then the composition was post-cured by oven baking it for 4 hours at 400° F. The results are as follows:

| PHYSICALS | PRESS CURE 10 min./350° F. | PRESS CURE + 4 hrs./400° F. |
|---|---|---|
| Hardness, Durometer | 51 | 53 |
| Tensile Strength, psi | 1308 | 1353 |
| % Elongation | 660 | 560 |
| Die B Tear, pi | 231 | 144 |

EXAMPLE 6

There was prepared a vinyl gum blend comprising 80 parts by weight of a vinyl-terminated dimethylpolysiloxane gum having a viscosity of $2.19 \times 10^7$ centipoise at 25° C. and 20 parts by weight of a 0.6 mole percent vinyl on-chain gum which was trimethylsiloxy end-stopped having a viscosity of $4.38 \times 10^7$ centipoise at 25° C. This gum had a blend viscosity of $2.5 \times 10^7$ centipoise at 25° C. To this there was added four parts by weight of the same silanol stopped methyl process aid of Example 1, 64 parts by weight of octamethylcyclotetrasiloxane treated fumed silica, one part by weight of the same hydride cross-linking agent of Example 1 and 0.015 parts by weight of methylethylketone peroxide as an inhibitor. This mixture was catalyzed with 0.5 parts by weight of 2,5-dimethyl-2,5-bis(t-butylperoxy)hexane per 100 parts by weight of the rest of the composition. The resulting composition was cured by press-curing it for 10 minutes at 350° F. and then post-cured by oven-baking it for 4 hours at 400° F. The results are as follows:

| PHYSICALS | PRESS-CURE 10 min./350° F. | PRESS-CURE + 4 hrs./400° F. |
|---|---|---|
| Hardness, Durometer | 70 | 75 |
| Tensile Strength, psi | 1176 | 1184 |
| % Elongation | 410 | 330 |
| Die B Tear, pi | 177 | 177 |

EXAMPLE 7

There was prepared a composition which was the same as in Example 1 except there was utilized 0.5 parts by weight of the same hydride oil as Examples 1 instead of 2 parts and the composition was catalyzed with 0.28 parts by weight of dicumyl peroxide per 100 parts of the rest of the composition in place of the catalyst shown in Example 1. The physicals were obtained after the composition had been press-cured for 10 minutes at 350° F. The results are as follows:

| PHYSICALS | PRESS-CURE 10 min./350° F. |
|---|---|
| Hardness, Durometer | 43 |
| Tensile Strength, psi | 1103 |
| % Elongation | 700 |
| Die B, Tear, pi | 78 |

EXAMPLE 8

There was prepared a composition that was exactly the same as Example 7 except there was utilized 2 parts by weight of the same hydride compound of Example 7 instead of the 0.5 parts by weight concentration. The composition was press-cured for 10 minutes at 350° F. and the physicals were evaluated which are as follows:

| PHYSICALS | PRESS-CURE 10 min./350° F. |
|---|---|
| Hardness, Durometer | 39 |
| Tensile Strength, psi | 1101 |
| % Elongation | 820 |
| Die B Tear, pi | 120 |

EXAMPLE 9

There was prepared a composition which was the same as that of Example 7 except there was used 4 parts by weight of the same hydride compound as in Example 7. The physicals were evaluated after the composition was press-cured for 10 minutes at 350° F. The results are as follows:

| PHYSICALS | PRESS-CURE 10 min./350° F. |
|---|---|
| Hardness, Durometer | 39 |
| Tensile Strength, psi | 1155 |
| % Elongation | 870 |
| Die B Tear, pi | 199 |

As the examples show and as discussed in the specification, in each case there must be balanced the particular vinyl gum blend, the hydride level and the peroxide level to get a system with optimum tear physical properties. However, it should be noted that even in that case, the tear will vary depending on the type of peroxide catalyst utilized. The type of peroxide catalyst used is very important in obtaining a cured composition with a high percent tear strength.

As the experimental results indicate, to obtain a composition with a tear strength above 100 pi, it is necessary to use the proper peroxide catalyst along with the proper concentrations of the vinyl gum blend, the hydride and peroxide. Also, particular vinyl gum blends and hydrides as well as peroxides will result in better tear strengths that are obtainable by the use of other compounds in the composition.

What is claimed is:

1. A polysiloxane composition curable to a silicone elastomer comprising:
   (A) 60–95 parts by weight of a vinyl-terminated linear diorganopolysiloxane gum having a viscosity in the range of $1 \times 10^6$ to $20 \times 10^7$ centipoise at 25° C. and having a vinyl concentration in the range of 0.005 to 0.1 mole percent vinyl and where the organo groups are monovalent hydrocarbon radicals;
   (B) 5.0 to 40.0 parts by weight of a vinyl-containing diorganopolysiloxane gum having a viscosity in the range of $20 \times 10^6$ to $100 \times 10^6$ centipoise at 25° C. and having a vinyl concentration in the range of 0.5 to 15.0 mole percent, wherein the organo groups are monovalent hydrocarbon radicals and the sum of (A) and (B) equals 100 parts by weight;
   (C) 10 to 300 parts by weight of filler, at least part of which is a reinforcing silica filler;
   (D) 0.1 to 25 parts by weight of hydride-containing polysiloxane having a hydride content ranging from 0.05 to 5.0 percent by weight and having a viscosity ranging from 10 to 1000 centipoise at 25° C.; and
   (E) an effective amount of an organic peroxide free radical initiator curing agent.

2. The composition of claim 1 wherein the vinyl-terminated gum has the formula,

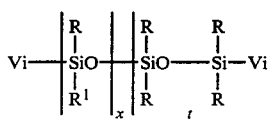

where Vi is vinyl, R is a $C_{1-8}$ monovalent hydrocarbon radical free of aliphatic unsaturation, $R^1$ is a $C_{1-8}$ monovalent hydrocarbon radical, x and t vary such that the viscosity of the gum ranges from $1 \times 10^6$ to $20 \times 10^7$ centipoise at 25° C. and the vinyl concentration of the gum ranges from 0.005 to 0.1 mole percent vinyl.

3. The composition of claim 2 wherein the radical $R^1$ is free of aliphatic unsaturation.

4. The composition of claim 2 wherein the vinyl-terminated gum has a vinyl content varying from 0.01 to 0.08 mole percent.

5. The composition of claim 1 wherein the vinyl-containing gum has the formula,

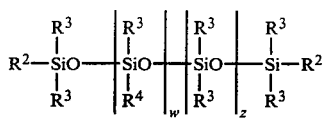

where $R^2$ and $R^4$ are $C_{1-8}$ monovalent hydrocarbon radicals, $R^3$ is a $C_{1-8}$ monovalent hydrocarbon radical free of aliphatic unsaturation, w and z vary such that the viscosity of the gum ranges from $20 \times 10^6$ to $100 \times 10^6$ centipoise at 25° C. and wherein the vinyl concentration of the gum varies from 0.5 to 15.0 mole percent.

6. The composition of claim 5 wherein $R^2$ is a $C_{1-8}$ monovalent hydrocarbon radical free of aliphatic unsaturation.

7. The composition of claim 1 wherein there is present from 10 to 200 parts by weight of a reinforcing filler selected from the group consisting of fumed silica and precipitated silica.

8. The composition of claim 7 wherein an extending filler is utilized in addition to the reinforcing filler.

9. The composition of claim 1 wherein the reinforcing filler is treated with treating agents selected from the class consisting of cyclopolysiloxanes and silazanes.

10. The composition of claim 1 wherein the curing agent is selected from organic peroxides.

11. The composition of claim 10 wherein the curing agent is selected from the group consisting of 2,5-dimethyl-2,5-di(t-butylperoxy)hexane, di-t-butylperoxide and 5-butylcumylperoxide.

12. The composition of claim 1 further comprising from 1 to 500 parts per million of a platinum catalyst cure accelerator.

13. The composition of claim 1 wherein the hydride-containing polysiloxane is a linear polysiloxane of the formula

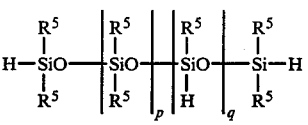

where $R^5$ is a $C_{1-8}$ monovalent hydrocarbon radical free of aliphatic unsaturation, p and q vary such that the viscosity of the hydride polysiloxane ranges from 10 to 1000 centipoise at 25° C. and the hydride content varies from 0.05 to 2.0 percent by weight.

14. The composition of claim 1 where the hydride-containing polysiloxane is a hydride resin having

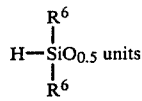

and SiO$_2$ units where R$^6$ is a C$_{1-8}$ monovalent hydrocarbon radical free of aliphatic unsaturation and the R$^6$+H to Si ratio varies from 1.0 to 2.7 wherein the hydride content of the resin varies from 0.05 to 2.0 weight percent.

15. The composition of claim 1 wherein the hydride-containing polysiloxane is a hydride resin having

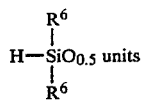

and SiO$_2$ units and (R$^6$)$_2$SiO units, where the R$^6$+H to Si ratio varies from 1.2 to 2.7, and R$^6$ is a C$_{1-8}$ monovalent hydrocarbon radical free of aliphatic unsaturation.

16. The composition of claim 1 wherein the curing agent is present at a concentration of at least 0.1 parts by weight for 100 parts by weight of the rest of the composition.

17. The composition of claim 1 further comprising from 1 to 50 parts by weight of an organopolysiloxane resin copolymer comprising

and SiO$_2$ units where R$^8$ is selected from the group consisting of vinyl radicals and monovalent hydrocarbon radicals free of aliphatic unsaturation with a ratio of R$_3^8$—SiO$_{0.5}$ units to SiO$_2$ units ranging from about 0.5 to 1 to 1 to 1, and where said copolymer contains about 2.5 to 10 mole percent vinyl groups.

18. The composition of claim 1 further comprising from 1 to 50 parts by weight of an organopolysiloxane resin copolymer comprising R$_3^8$SiO$_{0.5}$ units and SiO$_2$ units and R$_2^8$SiO units where R$^8$ is selected from the group consisting of vinyl radicals and monovalent hydrocarbon radicals free of aliphatic unsaturation, where the ratio of R$_3^8$—SiO$_{0.5}$ units to SiO$_2$ units is from about 0.5 to 1 to 1 to 1, and the R$_2^8$—SiO units are present in an amount of from about 1 to 10 mole percent based on the total number of moles of siloxy units in the copolymer, and where the resinous copolymer contains from about 2.5 to 10.0 mole percent vinyl groups.

19. The composition of claim 1 further comprising from 1 to 25 parts by weight of a process aid.

20. The composition of claim 19 wherein the process aid is a dihydrocarbon substituted polysiloxane oil having a hydrocarbon substituent silicon atom ratio from 1.0 to 2.0 and where such hydrocarbon substituents comprise at least one member selected from the class consisting of methyl, vinyl, ethyl, allyl, cyclohexenyl and phenyl groups, said polysiloxane oil comprising polysiloxane molecules containing an average of from 1 to 2 lower alkoxy groups bonded to each of the terminal silicon atoms.

21. The composition of claim 10 wherein the curing agent is 2,5 dimethyl-2,5-di(t-butylperoxy)hexyne-3.

22. The composition of claim 19 wherein the process aid is a hydroxylated organosiloxane, a hydroxylated silane, or mixture thereof, said process aid containing on average from 1.9 to 2.1 hydrocarbon radicals per silicon atom and from 1 silicon-bonded OH per 70 silicon atoms to 2 silicon-bonded OH per silicon atom.

23. The composition of claim 16 wherein the curing agent is present in a concentration of from 0.1 to 2 parts by weight per 100 parts of the rest of the composition.

24. A process for making a polysiloxane composition that is curable to a silicone elastomer comprising mixing:
(A) 60–95 parts by weight of a vinyl-terminaed linear diorganopolysiloxane gum having a viscosity in the range of $1 \times 10^6$ to $20 \times 10^7$ centipoise at 25° C. and having a vinyl concentration in the range of 0.005 to 0.1 mole percent vinyl and where the organo groups are monovalent hydrocarbon radicals;
(B) 5.0 to 40.0 parts by weight of a vinyl-containing diorganopolysiloxane gum having a viscosity in the range of $20 \times 10^6$ to $100 \times 10^6$ centipoise at 25° C. and having a vinyl concentration in the range of 0.5 to 15.0 mole percent, wherein the organo groups are monovalent hydrocarbon radicals and the sum of (A) and (B) equals 100 parts by weight;
(C) 10 to 300 parts by weight of filler, at least part of which is a reinforcing silica filler;
(D) 0.1 to 25 parts by weight of a hydride-containing polysiloxane having a hydride content ranging from 0.05 to 5.0 percent by weight and having a viscosity ranging from 10 to 1000 centipoise at 25° C.; and
(E) an effective amount of an organic peroxide free radical initiator curing agent.

25. A cured silicone elastomeric article formed by curing a mixture comprising:
(A) 60 to 95 parts by weight of a vinyl-terminated linear diorganopolysiloxane gum having a viscosity in the range of $1 \times 10^6$ to $20 \times 10^7$ centipoise at 25° C. and having a vinyl concentration in the range of 0.005 to 0.1 mole percent vinyl and where the organo groups are monovalent hydrocarbon radicals;
(B) 5.0 to 40.0 parts by weight of a vinyl-containing diorganopolysiloxane gum having a viscosity in the range of $20 \times 10^6$ to $100 \times 10^6$ centipoise at 25° C. and having a vinyl concentration in the range of 0.5 to 15.0 mole percent, wherein the organo groups are monovalent hydrocarbon radicals and the sum of (A) and (B) equals 100 parts by weight;
(C) 10 to 300 parts by weight of filler, at least part of which is a reinforcing silica filler;
(D) 0.1 to 25 parts by weight of hydride containing polysiloxane having a hydride content ranging from 0.05 to 5.0 percent by weight an having a viscosity ranging from 10 to 1000 centipoise at 25° C.; and
(E) an effective amount of an organic peroxide free radical initiator curing agent.

26. The article of claim 25 wherein the vinyl-terminated gum has the formula,

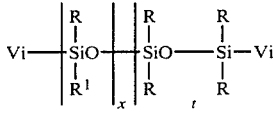

where Vi is vinyl, R is a C$_{1-8}$ monovalent hydrocarbon radical free of aliphatic unsaturation, R$^1$ is a C$_{1-8}$ monovalent hydrocarbon radical, x and t vary such that the viscosity of the gum ranges from $1 \times 10^6$ to $20 \times 10^7$ centipoise at 25° C. and the vinyl concentration of the gum ranges from 0.005 to 0.1 mole percent vinyl.

27. The article of claim 26 wherein the radical $R^1$ is free of aliphatic unsaturation.

28. The article of claim 26 wherein the vinyl-terminated gum has a vinyl content varying from 0.01 to 0.08 mole percent.

29. The article of claim 25 wherein the vinyl-containing gum has the formula,

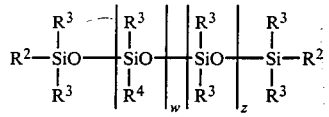

where $R^2$ and $R^4$ are $C_{1-8}$ monovalent hydrocarbon radicals, $R^3$ is a $C_{1-8}$ monovalent hydrocarbon radical free of aliphatic unsaturation, w and z vary such that the viscosity of the gum ranges from $20 \times 10^6$ to $100 \times 10^6$ centipoise at 25° C. and wherein the vinyl concentration of the gum varies from 0.5 to 15.0 mole percent.

30. The article of claim 29 wherein $R^2$ is a $C_{1-8}$ monovalent hydrocarbon radical free of aliphatic unsaturation.

31. The article of claim 25 wherein there is present from 10 to 200 parts by weight of a reinforcing filler selected from the group consisting of fumed silica and precipitated silica.

32. The article of claim 31 wherein an extending filler is utilized in addition to the reinforcing filler.

33. The article of claim 25 wherein the reinforcing filler is treated with treating agents selected from the class consisting of cyclopolysiloxanes and silazanes.

34. The article of claim 25 wherein the curing agent is selected from organic peroxides.

35. The article of claim 34 wherein the curing agent is selected from the group consisting of 2,5-dimethyl-2,5-di(t-butylperoxy)hexane, di-t-butylperoxide and 5-butylcumylperoxide.

36. The article of claim 25 further comprising from 1 to 500 parts per million of a platinum catalyst cure accelerator.

37. The article of claim 25 wherein the hydride-containing polysiloxane is a linear polysiloxane of the formula,

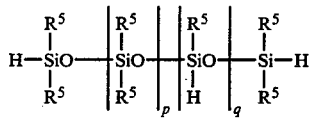

where $R^5$ is a $C_{1-8}$ monovalent hydrocarbon radical free of aliphatic unsaturation, p and q vary such that the viscosity of the hydride polysiloxane ranges from 10 to 1000 centipoise at 25° C. and the hydride content varies from 0.05 to 2.0 percent by weight.

38. The article of claim 25 where the hydride containing polysiloxane is a hydride resin having

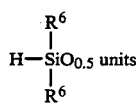

and $SiO_2$ units where $R^6$ is a $C_{1-8}$ monovalent hydrocarbon radical free of aliphatic unsaturation and the $R^6+H$ to Si ratio varies from 1.0 to 2.7 wherein the hydride content of the resin varies from 0.05 to 2.0 weight percent.

39. The article of claim 25 wherein the hydride-containing polysiloxane is a hydride resin having

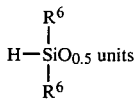

and $SiO_2$ units and $(R^6)_2SiO$ units where the $R^6+H$ to Si ratio varies from 1.2 to 2.7 and $R^6$ is a $C_{1-8}$ monovalent hydrocarbon radical free of aliphatic unsaturation.

40. The article of claim 25 wherein the curing agent is present at a concentration of at least 0.1 parts by weight per 100 parts by weight of the rest of the composition.

41. The article of claim 25 further comprising from 1 to 50 parts by weight of an organopolysiloxane resin copolymer comprising

and $SiO_2$ units where $R^8$ is selected from the group consisting of vinyl radicals and monovalent hydrocarbon radicals free of aliphatic unsaturation with a ratio of $R_3{}^8SiO_{0.5}$ units to $SiO_2$ units ranging from about 0.5 to 1 to 1 to 1, and where said copolymer contains about 2.5 to 10 mole percent vinyl groups.

42. The article of claim 25 further comprising from 1 to 50 parts by weight of an organopolysiloxane resin copolymer comprising

and

where $R^8$ is selected from the group consisting of vinyl radicals and monovalent hydrocarbon radicals free of aliphatic unsaturation, where the ratio of $R_3{}^8$—$SiO_{0.5}$ units to $SiO_2$ units is from about 0.5 to 1 to 1 to 1, and the $R_2{}^8$—SiO units are present in an amount of from about 1 to 10 mole percent based on the total number of moles of siloxy units in the copolymer, and where the resinous copolymer contains from about 2.5 to 10.0 mole percent vinyl groups.

43. The article of claim 25 further comprising from 1 to 25 parts by weight of a process aid.

44. The article of claim 43 wherein the process aid is a dihydrocarbon substituted polysiloxane oil having a hydrocarbon substituent silicon atom ratio from 1.0 to 2.0 and where such hydrocarbon substituents comprise at least one member selected from the class consisting of methyl, vinyl, ethyl, allyl, cyclohexenyl and phenyl groups, said polysiloxane oil comprising polysiloxane molecules containing an average from 1 to 2 lower alkoxy groups bonded to each of the terminal silicon atoms.

45. The article of claim 34 wherein the curing agent is 2,5-dimethyl-2,5-di(t-butylperoxy)hexyne-3.

46. The article of claim 43 wherein the process aid is a hydroxylated organosiloxane, a hydroxylated silane or mixtures thereof, said process aid containing on average from 1.9 to 2.1 hydrocarbon radicals per silicon atom and from 1 silicon-bonded OH per 70 silicon atoms to 2 silicon-bonded OH per silicon atom.

47. The article of claim 25 wherein the curing agent is present in a concentration of from 0.1 to 2 parts by weight per 100 parts of the rest of the composition.

48. The process of claim 24 wherein the curing agent is selected from organic peroxides.

49. The process of claim 48 wherein the curing agent is selected from the group consisting of 2,5-dimethyl-2,5-di(t-butylperoxy)hexane, di-t-butylperoxide and 5-butylcumylperoxide.

50. The process of claim 24 further comprising mixing from 1 to 500 parts per million of a platinum catalyst curing accelerator into the mixture.

51. The process of claim 24 wherein the curing agent is present at a concentration of at least 0.1 parts by weight per 100 parts by weight composition.

52. The process of claim 24 further comprising mixing from 1 to 50 parts by weight of an organopolysiloxane resin copolymer comprising $R_3^8SiO_{0.5}$ units and $SiO_2$ units, where $R^8$ is selected from the group consisting of vinyl radicals and monovalent hydrocarbon radicals free of aliphatic unsaturation and having a ratio of $R_3^8SiO_{0.5}$ units to $SiO_2$ units ranging from about 0.5 to 1 to 1 to 1, and where said copolymer contains about 2.5 to 10 mole percent vinyl groups.

53. The process of claim 24 further comprising mixing from 1 to 50 parts by weight of an organopolysiloxane resin copolymer comprising $R_3^8SiO_{0.5}$ units, $SiO_2$ units and $R_2^8SiO$ units, where $R^8$ is selected from the group consisting of vinyl radicals and monovalent hydrocarbon radicals free of aliphatic unsaturation, where the ratio of $R_3^8SiO_{0.5}$ units to $SiO_2$ units is from about 0.5 to 1 to 1 to 1 and the $R_2^8SiO$ units are present in an amount of from about 1 to 10 mole percent based on the total number of moles of siloxy units in the copolymer, and where the resinous copolymer contains from about 2.5 to 10.0 mole percent vinyl groups.

54. The process of claim 24 further comprising mixing from 1 to 25 parts of a process aid into the mixture.

55. The process of claim 24 wherein the curing agent is present in a concentration of from about 0.1 to 2 parts by weight per 100 parts by weight composition.

56. A method of making an elastomeric silicone article comprising:
   (i) mixing:
      (A) 60–95 parts by weight of a vinyl-terminated linear diorganopolysiloxane gum having a viscosity in the range of $1 \times 10^6$ to $20 \times 10^7$ centipoise at 25° C. and having a vinyl concentration in the range of 0.005 to 0.1 mole percent, and where the organo groups are monovalent hydrocarbon radicals;
      (B) 5.0 to 40.0 parts by weight of a vinyl-containing diorganopolysiloxane gum having a viscosity in the range of $20 \times 10^6$ to $100 \times 10^6$ centipoise at 25° C. and having a vinyl content in the range of 0.5 to 15.0 mole percent, wherein the organo groups are monovalent hydrocarbon radicals and the sum of (A) and (B) equals 100 parts by weight;
      (C) 10 to 300 parts by weight of a filler, at least part of which is a reinforcing silica filler;
      (D) 0.1 to 25 parts by weight of a hydride-containing polysiloxane having a hydride content ranging from 0.05 to 5.0 percent by weight and having an organic peroxide viscosity ranging from 10 to 1000 centipoise at 25° C.; and
      (E) an effective amount of a free radical initiator curing agent;
   (ii) forming the mixture of step (i) into the desired shape; and
   (iii) heating the shaped composition at an elevated temperature in order to effect curing of the composition.

57. The method of claim 56 wherein the curing agent is selected from organic peroxides.

58. The method of claim 57 wherein the curing agent is selected from the group consisting of 2,5-dimethyl-2,5-di(t-butylperoxy)hexane, di-t-butylperoxide and 5-butylcumylperoxide.

59. The method of claim 56 further comprising mixing 1 to 500 parts per million of a platinum catalyst curing accelerator into the mixture of step (i).

60. The method of claim 56 wherein the curing agent is present in a concentration of at least 0.1 parts by weight per 100 parts by weight composition.

61. The method of claim 56 further comprising mixing in step (i) from 1 to 50 parts by weight of an organopolysiloxane resin copolymer comprising $R_3^8SiO_{0.5}$ units and $SiO_2$ units, where $R^8$ is selected from the group consisting of vinyl radicals and monovalent hydrocarbon radicals free of aliphatic unsaturation and having a ratio of $R_3^8SiO_{0.5}$ units to $SiO_2$ units ranging from about 0.5 to 1 to 1 to 1, and where said copolymer contains about 2.5 to 10 mole percent vinyl groups.

62. The method of claim 56 further comprising mixing in step (i) from 1 to 50 parts by weight of an organopolysiloxane resin copolymer comprising $R_3^8SiO_{0.5}$ units, $SiO_2$ units and $R_2^8SiO$ units, where $R^8$ is selected from the group consisting of vinyl radicals and monovalent hydrocarbon radicals free of aliphatic unsaturation, where the ratio of $R_3^8SiO_{0.5}$ units to $SiO_2$ units is from about 0.5 to 1 to 1 to 1 and the $R_2^8SiO$ units are present in an amount of from about 1 to 10 mole percent based on the total number of siloxy units in the copolymer, and where the resinous copolymer contains from about 2.5 to 10.0 mole percent vinyl groups.

63. The method of claim 56 further comprising mixing in step (i) from 1 to 25 parts of a process aid.

64. The method of claim 56 wherein the curing agent is present in a concentration of from 0.1 to 2 parts by weight per 100 parts by weight composition.

65. The method of claim 56 wherein curing is effected at a temperature greater than 100° C.

66. The method of claim 56 further comprising the step of post curing the article.

* * * * *